United States Patent [19]

Machtig

[11] Patent Number: 5,221,937
[45] Date of Patent: Jun. 22, 1993

[54] VIDEO MANNEQUIN

[76] Inventor: Jeffrey S. Machtig, 500 N. Dixie Hwy., Hollywood, Fla. 33020

[21] Appl. No.: 739,606

[22] Filed: Jul. 31, 1991

[51] Int. Cl.$^5$ .............................................. G03B 21/26
[52] U.S. Cl. ...................................... 353/28; 353/30; 353/47
[58] Field of Search ........................ 352/28, 30, 47, 46, 352/50, 51, 121, 122, 86; 446/297, 298, 300, 301; 359/443, 451, 453, 458, 460

[56] References Cited

U.S. PATENT DOCUMENTS

| | | |
|---|---|---|
| 1,653,180 | 12/1927 | Jalbert . |
| 3,053,144 | 9/1962 | Harries et al. ........................ 352/86 |
| 3,351,409 | 11/1967 | McGuire ............................. 350/117 |
| 3,463,569 | 8/1969 | Bratkowski ........................ 350/129 |
| 3,479,111 | 11/1969 | Gabor ................................. 352/44 |
| 3,719,412 | 3/1973 | Reiback .............................. 350/117 |
| 3,832,031 | 8/1974 | Land .................................. 350/117 |
| 3,950,085 | 4/1976 | Grimm ............................... 353/119 |
| 3,973,840 | 8/1976 | Jacobs et al. ........................ 352/86 |
| 3,976,359 | 8/1976 | White ................................. 350/126 |
| 4,076,398 | 2/1978 | Galbraith ............................. 353/69 |
| 4,098,550 | 7/1978 | Randolph ............................ 352/69 |
| 4,104,625 | 8/1978 | Bristow et al. ................. 340/324 R |
| 4,364,635 | 12/1982 | Stief ................................... 350/125 |
| 4,375,909 | 3/1983 | Bos .................................... 350/117 |
| 4,408,850 | 6/1983 | Novek ................................. 353/98 |
| 4,839,783 | 6/1989 | Arai ................................... 362/374 |
| 4,978,216 | 12/1990 | Liljegreu et al. ..................... 353/74 |

FOREIGN PATENT DOCUMENTS

2088109 6/1982 United Kingdom .

*Primary Examiner*—William A. Cuchlinski, Jr.
*Assistant Examiner*—William C. Dowling
*Attorney, Agent, or Firm*—Malin, Haley, DiMaggio & Crosby

[57] ABSTRACT

The present invention provides a DIMENSIONAL HEADSCREEN by a novel use of LCD video image projection wherein a means is provided for creating said headscreen having such shape, color, and likeness that when used in combination with rear image projection techniques produces a life like video mannequin whose appearance is strikingly similar to that of the original model. The process including the steps of recording by use of real time video recording which allows for alignment, transferring the recorded images onto a sculpture stand for distance correction, and placing clay directly onto the sculpture stand wherein the clay can be molded to replicate said image of said model. From the clay a headscreen having a colored surface induced for diffusion of light on which images are projected for viewing and a means for coating the outer surface thereof for further reducing light reflection from external indirect sunlight.

15 Claims, 10 Drawing Sheets

56. FOREHEAD
58. EYEBROW, NOSE AREA
60. EYEBALL
62. EYE SOCKET
64. CHEEK BONE AREA
66. OUTER MOUTH AREA
68. LIP AREA
70. CHIN
72. OUTERFACIAL AREA
74. EXTREME SIDES

VIDEO MANNEQUIN

BACKGROUND OF THE INVENTION

1. Field of the Invention

The invention relates to the field of display devices and in particular to a video mannequin and also to a method and apparatus for producing a sculpture of a human head for use with the apparatus using LCD video projection for the manufacture of a rear projection headscreen adapted to display a video image projected thereon. The apparatus includes a means for verification of facial alignment and proportioning during the step of sculpting the headscreen to confirm compatibility with a projected real time video image before manufacture of the headscreen based upon said sculpture, and a calibrated method for treating the inner and outer surfaces of the headscreen in such a way that the video image projected thereon appears life-like, thereby creating a video mannequin having clone-like qualities.

2. Background of the Invention

The use of mannequins, once thought of as an oddity for the curious, has evolved into three dimensional displays giving the appearance of live beings. By the projection of an image of a face exhibiting facial movements on a mold formed in the likeness of a human head, the mold takes on the appearance that it is alive and capable of communication. Placement of the molded likeness on a torso simulates a human body and, upon projecting an animated film facial image onto the molded likeness, produces what is referred to as a talking mannequin.

One use of the animated mannequin is for replicating famous persons as an entertainment or educational tool. By means of projecting an image of a famous person onto a headscreen formed in the likeness of a human head, the mold acts as the screen thereby displaying the person's image in a dimensional format. While dimensional projection can enhance viewing, an improperly positioned projector or, more likely, a molded likeness that is not compatible with the image projected, will detract from, if not destroy, the clarity and realism of the display. In addition, if the molded likeness and the projected image are not compatible, distorted or peculiar images result. For instance, if the projector is spaced from a molded likeness by a given amount, the molded likeness, and thus the headscreen, must account for the viewing angle and focal length of the projector so that the projected image is matched to curvatures of the headscreen. Whatever the combination, unless the projector, focal length, and shape of the molded likeness is matched, the attendant distortion will render the molded likeness unusable. When the apparatus which projects the image of a person's face onto a headscreen requires a predetermined distance to properly locate the projected eyes, clarity may be lost if placement of the eyes in the headscreen is not proper. Attempts to rectify clarity by lens adjustment or camera placement resulting in the location of the projected eyes changing anywhere from the bridge of the nose to the side of the face.

The prior art attempts to award these limitations include making the molded likeness (thus the projection screen) as generic, and hence detailess, as possible. This, however, defeats the object of a dimensional headscreen by limiting the viewer to a viewing position so distant from the mannequin that details are obscured. Closer viewing reveals a rounded dimensional screen and loss of realism.

Prior art mannequin headscreens suffer from the disadvantage of having inaccuracies in headsize, symmetry, or specific feature sizes. Even at substantial distances the general public is no longer easily fooled as to the accuracy of the facial configuration of a mannequin of a famous person because television has allowed the public to become familiar with their facial configurations. Thus, viewers demand exceptional quality made possible only by the ability to match facial features and a specific molded likeness with a specific projected image. For this reason alone, it is no longer practical to have a generic headscreen with a famous person's likeness projected thereon if it is to be used as a projection screen in a display setting. Such a projection is incompatible with the projected image making the resulting display unconvincing, inaccurate and, for most applications, useless.

The prior art employs the use of film projection such as 16 mm or Super 8 in combination with a voice recording to assist in giving the mannequin a sense of realism. Typically, the image is projected onto a front or rear screen using projection equipment that is susceptible to friction and other types of deterioration. Frontal imaging is carried out by projecting a person's image onto that person's molded likeness by placement of the projector directly in front of the molded likeness. Such direct placement blocks the view of onlookers and hence is not practical. Therefore, projectors used in frontal image projection are typically placed above or below the molded likeness and the projector angled to project onto the mold. However, this leads to a phenomenon known as keystoning, which is the elongation of features upon the projection screen or mold. In addition, cigarette smoke or other environmental haze associated with the viewing public may disrupt the image as it is being transferred. In an effort to eliminate the problems associated with frontal imaging a natural progression evolved into the use of rear image or rear screen projection.

The person who is to be replicated by the animated mannequin technology described herein will be referred to as the "actor". Rear image projection requires the use of a translucent molded likeness of the actor's head, hereinafter referred to as a headscreen, wherein an image is projected from behind onto the inner surface of the headscreen for viewing from outside of the headscreen. By projecting from the rear, the image is less affected by environmental conditions than with frontal projection, but is still subject to the limitations of facial featuring. The headscreen, being a hollow shell incorporating stock human facial features utilizes a short projector focal length resulting in a projected image which is subject to washouts and hot spots. Washouts arise from the thin dispersion of projector light along angled surfaces, such as the undersides of the nose and chin. Hot spots are an accumulation of reflected images on angled surfaces. Hot spots also typically occur on surfaces that are normal to the direction of incident projected light. In addition, headscreens of the prior art are limited in use to viewing from the front thereof. Typically, viewing from angles greater than 20 degrees off of straight-on has resulted in image unevenness, decrease in light intensity, and a general loss of image clarity. Viewing from angles greater than 40 degrees off center may produce an image that is unintelligible. Further, headscreens having anything greater than rounded or muted facial features, such as a realistic nose, leads to hot spots wherein the accumulation of plural images on a single facial feature shows up as an unrealistic looking high intensity light spot. Either event leads to uneven surface brightness, loss of color, and loss of resolution. Loss of color intensity inherent in prior art projection apparatus is further added to the list of problems as the prior art does not teach any means for correction of color loss due to film projection. The object of a dimensional screen is defeated if the viewer is forced to observe the video mannequin from a distance greater than twenty feet in order to prevent the viewer from noticing the rounded, unrealistic, facial features. This loss of genuineness is exacerbated by use of film projection and/or transfer means such as mirrors or image conduit.

Generally, the creation of a headscreen for use in rear image projection is a multiple step process. Heretofore the first step comprised creating a molded likeness of the actor's face. A generic mold would then be fabricated having limited facial feature detail to avoid the aforementioned problems so that the mold conforms generally to the projected image. A plaster cast is made of the molded likeness, whereafter a transparent plastic mannequin head with integral headscreen is formed by vacuum process, the headscreen retaining the shape of the molded likeness. A coating is applied to the interior of the facial portion to create a translucent surface. The headscreen is then placed onto a torso whereby an image is projected onto the inner surface of the head, which allows viewing from the exterior thereof.

As previously discussed, the prior art limits the molded likeness to certain facial features whether imaging by frontal or rear projection. Thus a molded likeness that depicts an actual person's head and which is projected upon by prior art rear projection techniques, results in a poor headscreen. In addition, if a molded likeness is of a famous person and a substitute actor is used for taping, idiosyncracies caused from the projection of a moving face into a concave contoured screen further add to the problems caused by projected light paths contacting angled and contoured features, rendering the headscreen inaccurate if not useless. If portions of the headscreen are not properly aligned with the projection means, low intensity areas that lack authenticity or lack the original person's likeness result. Calibration of the molded likeness to obtain the proper balance between model, mannequin headsize, facial symmetry, specific feature sizes, and particulars of the image projection on a case by case basis has been difficult. No one has heretofore been able to calculate an apparatus and method to obtain a headscreen exhibiting clone-like qualities. For this reason, prior art headscreens are typically made from a generic mold to accommodate most any face projected thereon.

Thus, it should be evident that the manufacture of the headscreen is critical to creating a life like animated mannequin. The ability to manufacture a headscreen having clone-like qualities has not heretofore been addressed nor has a means been made available for accurately adapting the facial features of a particular actor to a molded headscreen.

While there is no prior art known to the inventor that teaches a method of constructing a truly accurate headscreen acceptable for use with rear image projection, there are rear image projection techniques which use headscreens and further illustrate the aforementioned problems. One such device utilizing rear imaging is found in U.S. Pat. No. 3,973,840 to Jacobs et al. Jacobs discloses the use of a generic headscreen of the type previously described in combination with a conventional mirror for reflecting film projected images from within the mannequin torso to the mirror mounted in the head, and to in turn reflect the image therefrom onto a headscreen. While the purpose of this device is to allow an image to be projected from within, it demonstrates how the use of a mirror limits the projected image to those portions of the screen oriented at a right angle to the mirror. Further, it should be noted that optic losses result when reflecting an image from a planar reflective surface onto a concave, undulated, screen surface. The orientation and placement of the mirror results in portions of the headscreen being distorted or otherwise lacking illumination. For instance, improper angling of the mirror causes a reverse form of keystoning. Lack of side screen illumination reduces the image clarity when viewed from other than a 20° angle on either side of center of the mannequin face. As the mirror limits the size and shape of the headscreen which can be used, the use thereof makes it impossible to create a headscreen having images of clone-like quality. Again, as the headscreen is based on a molded likeness of the actor, undue experimentation with the headscreen would be required to make the Jacobs device more realistic.

Another device utilizing rear imaging is found in U.S. Pat. No. 4,978,216 to Liljegren et al. Liljegren discloses an apparatus using fiber optic conduit for transmission of projection images onto a headscreen. However, the use of fiber optics results in a lack of coordination between the formation of the headscreen and the projected image, requiring the use of a generic featured headscreen. The resulting headscreen is limited to a nearly flat frontal portion, any facial features thereon being rounded or muted. Such devices are also prone to improper orientation of the fiber optic strands causing loss of illumination, loss of side screen illumination, poor resolution and color, as well as side image washout. Also, as discovered by myself through experimentation, use of bundled fibers severely degrades the image and, by design significantly less than the available input light is transferred. This results in an image transfer which can be washed out by ordinary room light. In addition, image transfer intensity rapidly falls off as an observer moves from a position of direct view of the headscreen to an off center or side view. This fall-off is due to the forward-directional nature of the projecting means. Further, improper sizing of fiber bundles reveals the fiber superstructure within the transfer means upon projection. Obviously the use of a projection means having distinct pixel qualities is not possible under the named prior art due to disruption or loss during transfer. Nothing in the prior art discloses an apparatus for transferring a visual signal that is capable of reproducing an image of clone-like quality.

Both Liljegren and Jacobs disclose the use of various film projection devices of 16 mm or Super 8 continuous loop format. Neither employs the use of LCD video technology in the form of magnetic tape or laser disc or the use of such in combination with interactive/message type apparatus. In addition, since both the Liljegren and Jacobs projection means are limited to film projection, the use of pixel pattern images would not add clarity or resolution as the pixel pattern would be disrupted during transformation from film to pixel format. As with Jacobs, Liljegren does not teach the importance of projecting an image onto a headscreen using the same means as is used for molding likeness the headscreen.

Therefore, a method of creating a molded likeness and headscreen sculpture using video projection for use in combination with rear projection images is needed wherein the headscreen is produced by an apparatus which confirms compatibility of the recorded images with the final projected images before actual manufacture of the headscreen. While efforts have been made toward meeting some of the problems associated with use of dimensional screens, no satisfactory solution has heretofore been provided. It is, therefore, to the effective resolution of these problems and, further, to a means for crafting a molded likeness having clone-like qualities for use as a mannequin allowing better color, resolution and overall realism, that the instant disclosure is directed.

SUMMARY OF THE INVENTION

The principle object of the present invention is to provide a simple and reliable rear screen projection apparatus which overcomes the problems previously mentioned in the production of mannequin headscreens used in image projection and to provide a novel use of video image projection. My invention provides a unique apparatus for creating an unlimited number of individualized headscreens to enable each headscreen to be easily constructed having excellent shape, color, and likeness so that, when used in combination with rear image projection techniques, the overall effect is a life like video mannequin whose appearance is strikingly similar to that of the original actor even upon close inspection.

The creation of a headscreen in accordance with the instant invention is a multiple step process beginning with positioning an actor to be reproduced in front of a video camera. Because alignment of the actor's head is necessary, it can be either secured into a stationary position using a jig, or, by use of a simultaneous real time video display, the model can view her or himself as projected within a grid, or other super-imposed alignment tool such as a replicated headscreen, which allows the model to adjust his or her position to obtain an optimally aligned recording. To enhance the recording function, the video camera is rotated 90 degrees to record in "vertical format" for capturing the entirety of the actor's head, thereby maximizing the imaging capacity. Next, a recording is made of the actor and of a master grid, the recording first being used for aligning same with a corresponding verification grid, second for the actual molding/sculpting of a clay mold later used to create the headscreen, and third as the final image projected during video display of the mannequin without the alignment grid.

A first transferring apparatus is used for projecting the recorded image onto a Projection Assisted Sculpture Stand where the verification grid is located, the sculpture stand having an adjustment feature for matching the projected grid to the verification grid and providing a distance corrected sculpture stand. The sculpture stand incorporates the transferring apparatus for projecting the actor's image onto a sculpting base having further adjusting means allowing image projection in a vertical format. Clay placed onto the sculpting base receives projected images by means of frontal image projection. The transferring means includes the use of an LCD video projector or the like whose standard projection format is rotated from its conventional horizontal format to a vertical format. In addition, the sculpting base is rotatable allowing a check of dimensional modeling and for reducing operator fatigue. By placement of clay onto the distance corrected sculpture stand the molding of clay into a dimensional sculpture is performed while the model's image is being projected onto the clay thereby allowing the operator to produce an accurate dimensional reproduction of the model having clone-like qualities and further incorporate, if necessary, any changes to the sculpture to conform to the transferring apparatus and actively moving sections of the actor with a constant preview of the final projection means.

Once the clay mold, or sculpture, is complete a cast is formed from the sculpture whereby a headscreen is produced through conventional vacuum forming processes. The headscreen is formed, preferably, of UVEX material, or the like. The inner surface of the headscreen is sandblasted or otherwise treated to create a surface having pore sizes of 3 to 8 microns. After sandblasting, a molecular dye is introduced, or otherwise incorporated into the plastic, to alter the color of the headscreen so that, during the projection step, that is, when the video mannequin is being exhibited, facial features and colors become attenuated and rendered lifelike. The outer surface of the headscreen is also airbrushed with an opaque skin colored paint. The combination of dye and paint assimilates that of human skin when projected thereon by a video projector, reflecting and refracting light. In addition either coating can be used in varying amounts to further attenuate coloration, alter illumination, or add additional light blocking to enhance features or create shadows. It is important to note, however, that excessive use of dye and/or paint may result in undesired blockage of light transmission, which would impair the visual quality of the video mannequin. Therefore, care should be exercised to avoid any undue impairment to the light transmitting quality of the headscreen.

The headscreen may then be placed on a torso for added realism and a second transferring means employed for projecting the recorded image of the actor directly onto the inner surface of the headscreen for viewing an image thereon from the front thereof. In addition, the second transferring means can be located remotely and still have the image projected into the headscreen by use of a plurality of lenses, contoured mirrors, prisms, or the like capable of transferring pixelized images with minimal disruption of image integrity.

Use of the projection assisted sculpture stand and related video projection allows an operator of virtually any skill to mold clay into a sculpture that compensates for idiosyncracies of the projection means and to provide a dimensional rear projection screen having clone like features with alterations made only to those areas of the headscreen where facial features of the projected image movements necessitate rounded headscreen elements. The completed headscreen is then incorporated with the original video recording thereby producing a product accurately matching the original recording.

Therefore, the primary objective of the present invention is to provide a novel, life-like, video mannequin capable of giving a convincing verbal and visual presentation of a message in settings not requiring human intervention to provide said message.

It is also a primary objective of the present invention to provide a novel method of manufacturing a headscreen for the above mentioned video mannequin.

It is a still further object of the instant invention to provide an apparatus for accurately manufacturing a video mannequin headscreen using real time vertical format video projection technology.

Another object of the present invention is to utilize the full screen of the image recording medium used to create an optimum in a vertical format display of the actor giving a verbal presentation.

Yet still another object of the invention is to produce a headscreen from UVEX whose inner surface is sandblasted to a uniform texture and dyed while selective portions of the outer surface are painted, the combination simulating that of a human skin surface when projected thereon.

Still another object is to use light blocking elements on the headscreen to further even coloration, illumination, enhance features, or create shadows.

Yet still another object of the instant invention is to provide a headscreen capable of viewing from center line to off center angles exceeding 140 degrees without a depreciable loss of light intensity.

Another object of the invention is the teaching of a means for positioning an actor in front of an image recording device having a means for aligning the actor with a grid pattern which can be used to assist the actor in self correction during recordation of the actor's image for later projection on finished headscreen, as well as for aligning the actor's image as projected onto a sculpting stand to provide exact dimensional characteristics for use in constructing a clay model of the headscreen.

Still another objective is to provide a sculpting stand for use in sculpting a mold of the image projected incorporating a transferring means simulating that of the projection means used in final projection of the actor's image during exhibition of the video mannequin.

Yet still another objective is to provide a sculpting stand having a rotatably sculpting surface allowing ease of dimensional verification of a sculpture by use of image projection or other measurements.

Another objective is to provide a transferring means for projecting a recorded image directly into the headscreen using an LCD video projection wherein the image is viewable from the front thereof.

Yet another object of the instant invention is to provide a means for coordinating all of the particularities of the projection means through the headscreen sculpture process.

Still another objective is to provide a transferring means for projecting a recorded image directly into the headscreen using an LCD video projection means positioned at a location other than that of directly behind the headscreen by use of a plurality of lenses, contoured mirrors, prisms, or the like capable of transferring LCD video pixel images with minimal disruption of pixel integrity.

Yet still another object of the present invention is to provide a video mannequin headscreen that is capable of exhibiting a moving image that is not washed out from indirect sunlight or photographic flashes.

In accordance with these and other objects which will be apparent hereinafter, the present invention will now be described with particular reference to the accompanying drawings.

BRIEF DESCRIPTION OF THE DRAWINGS

The accompanying drawings illustrate the mannequin figure and image projection system of the disclosed invention. In such drawings.

DETAILED EMBODIMENT OF THE INVENTION

Figure 1:
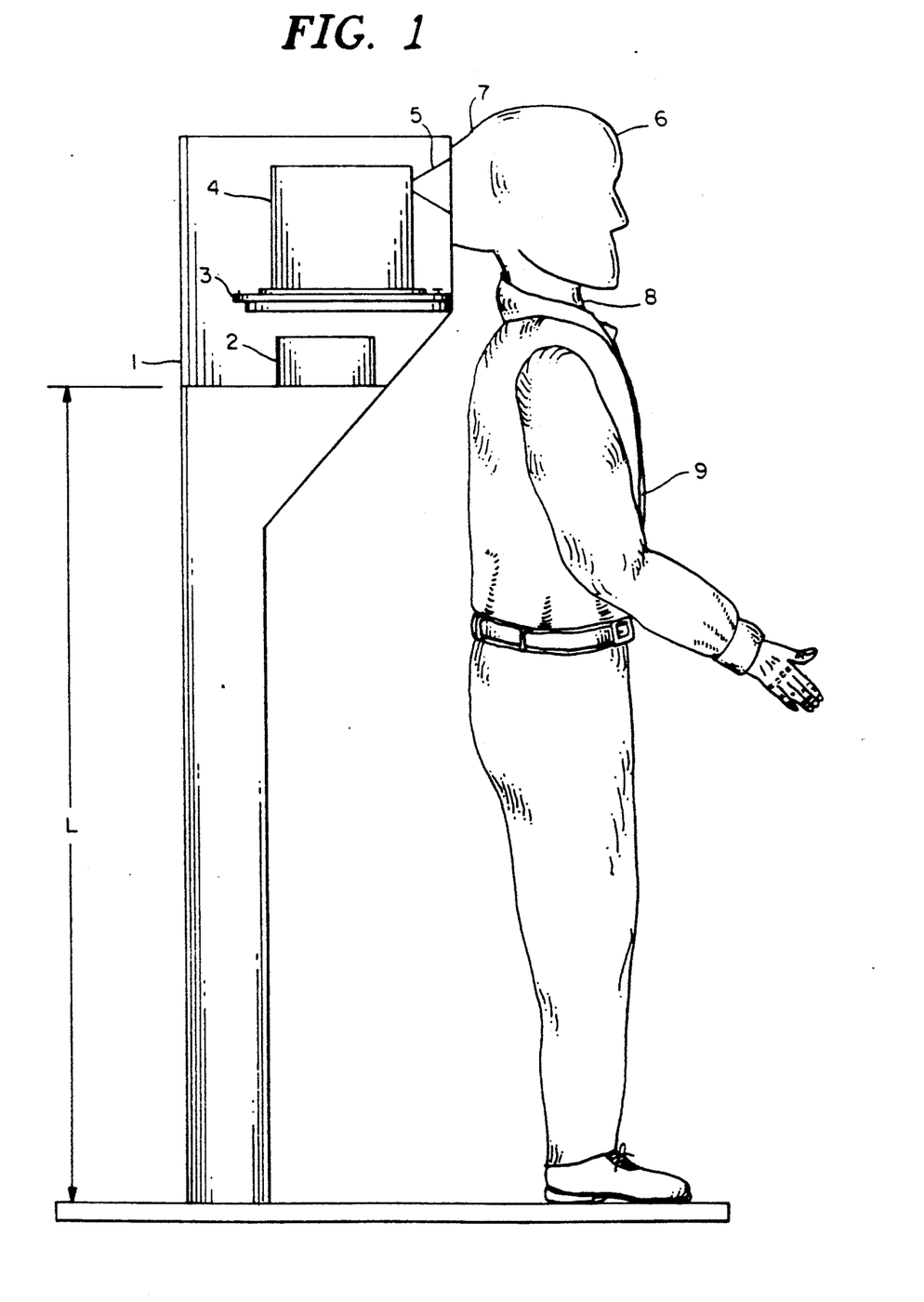
FIG. 1 is a side elevational view of my video mannequin utilizing an upright stand arrangement with video projection directly into a headscreen.

Referring now to FIG. 1, the video mannequin of the instant invention is illustrated together with a support 1 having a means for supporting a recorder/playback device 2 which is coupled to adjustable projector base 3 and LCD video projector 4. Further, projector 4 is supported on base 3 for projection of an image 5 onto a headscreen 6. For illustration purposes only, the video mannequin is shown in an upright position with neck 8 and torso 9 so that the complete package appears realistic, the height L of support 1 being adjustable by any convenient means. Projector 4 may project image 5 directly into the headscreen using an LCD video projection means positioned at a location other than directly behind the headscreen by use of a plurality of lenses, contoured mirrors, prisms, or the like, having a means for transferring LCD video images with minimal disruption of pixel integrity.

Figure 2A:
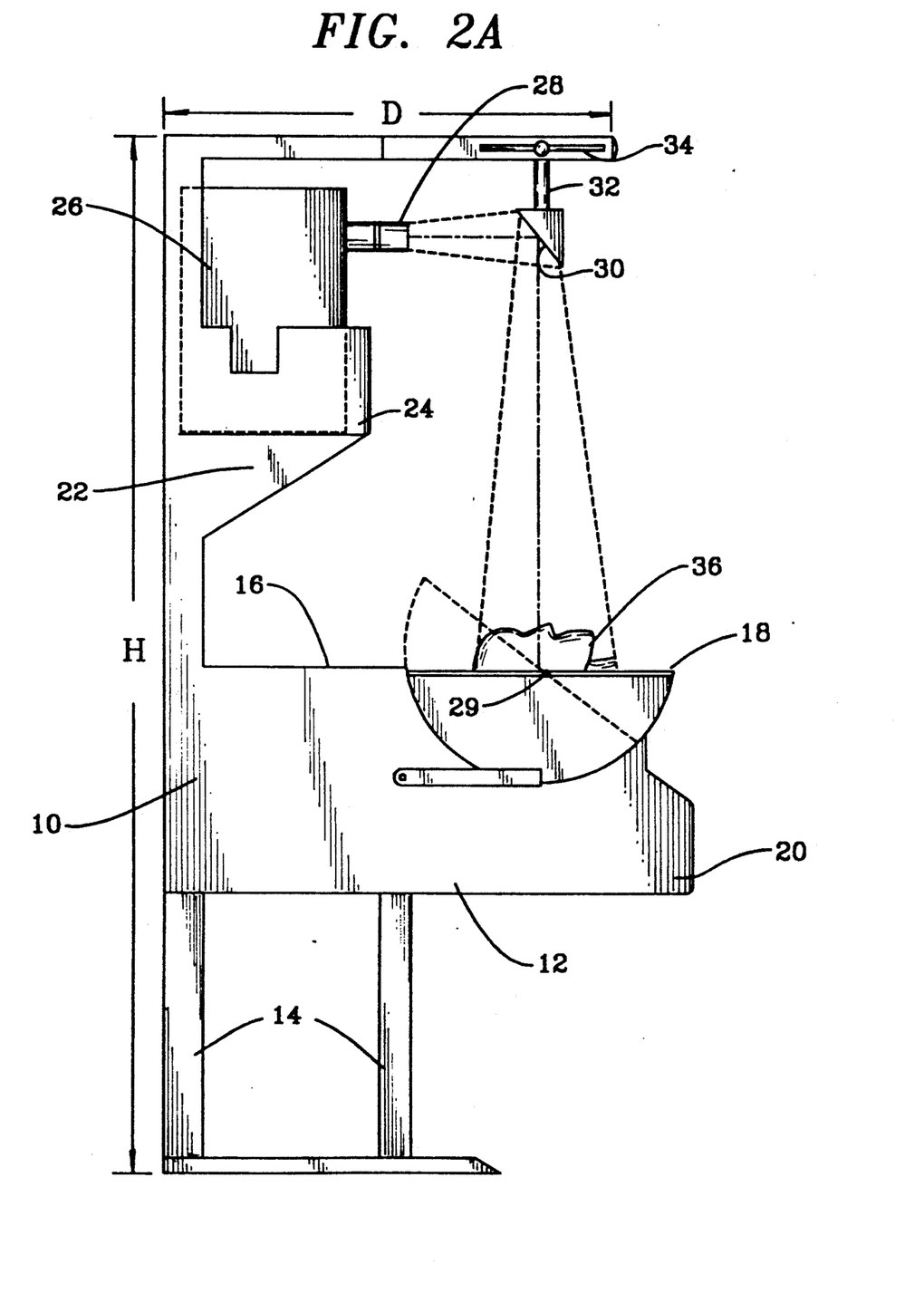
FIG. 2A is a side elevational view of a projection assisted sculpting stand.

Now referring to FIG. 2, my novel projection assisted sculpture stand 10 is illustrated as used for molding a quantity of clay into a sculpture, which in turn is used to create a cast in the making of a headscreen. The stand 10 comprises a frame 12 supported by a plurality of legs 14 with platform 16 having hingedly mounted thereto a sculpture surface 18 positioned at a height H above the ground and made adjustable by pivot 29 to ease operator access to the clay during the molding step. It is to be understood that the height of surface 18 can vary and is not deemed limited by this disclosure. It is desirable, but not necessary, that platform 16 define a cavity 20 located beneath surface 18 for placement of sculpturing tools.

Projector stand 22 is coupled or permanently attached to frame 16 and has a shelf 24 or the like which acts to support a video projector 26. The video projector 26 may be, in one embodiment, an Epson Crystal Image Video Projector or the like having LCD qualities. Projector placement is upright creating projection of images in vertical format. Lens 28 has a fixed lens length or preferably an adjustable lens having zoom qualities between 40 mm and 150 mm and is projected toward mirror 30 held in place by support 32 with slidable means 34 coupled to projection stand 22. Mirror 30 may be mylar or any other reflective surface with an angle between 80 degrees to 100 degrees with a preferred angle of 90 degrees, thereby allowing a reflection from projector 26 to surface 18. Projector 26 may be positioned so as to project directly onto surface 18 without the aid of a reflective surface such as 30. Variation of mirror surface angle and slidable means 34 allows surface 18 to rotate toward the operator for enhanced viewing of surface 18.

Surface 18 allows an operator to use the apparatus as a sculpting table whereby an operator of any skill can mold a quantity of clay 36 into a shape that conforms generally to the likeness of the actor while simultaneously compensating for certain idiosyncracies inherent in the projection means.

The projection assisted sculpture stand 10 is employed in the manufacture of the video mannequin head and headscreen and provides the substantial advantage of permitting the artisan to create a headscreen capable of displaying a realistic video image to an audience. The process includes the steps of:

(1) set up the recording camera in relation to the actor's head brace;

(2) use a recording camera to project an image of master grid onto a verification grid and fixedly align the camera with respect to the head brace;

(3) set actor's head and face in head brace facing recording camera and using real time display through said recording camera, project the image of the actor's face onto the verification grid;

(4) move the actor's face with respect to the brace so that the actor's face aligns with the verification grid to obtain proper alignment of the actor's face with respect to the recording camera.

(5) record an audio-video message as delivered by the actor;

(6) project an image of the actor onto the verification grid to obtain an outline of the actor's head;

(7) mold said clay into a dimensional sculpture of the actor's head in accordance with said outline, measurements of the facial and head features and the visual projection of the actor's face onto said clay from said recorded audio-video message;

(8) form a cast of said dimensional sculpture and fabricate a hollow molded shell therefrom which conforms with said cast;

(9) texture the inner surface of the face portion of said hollow shell to form a headscreen therein;

(10) tint the textured inner surface of said headscreen;

(11) apply translucent film of varied densities to specified areas of the outer surface of said head screen. Later steps may include the addition of ears and, if appropriate, facial hair.

Figures 2B, 2C:
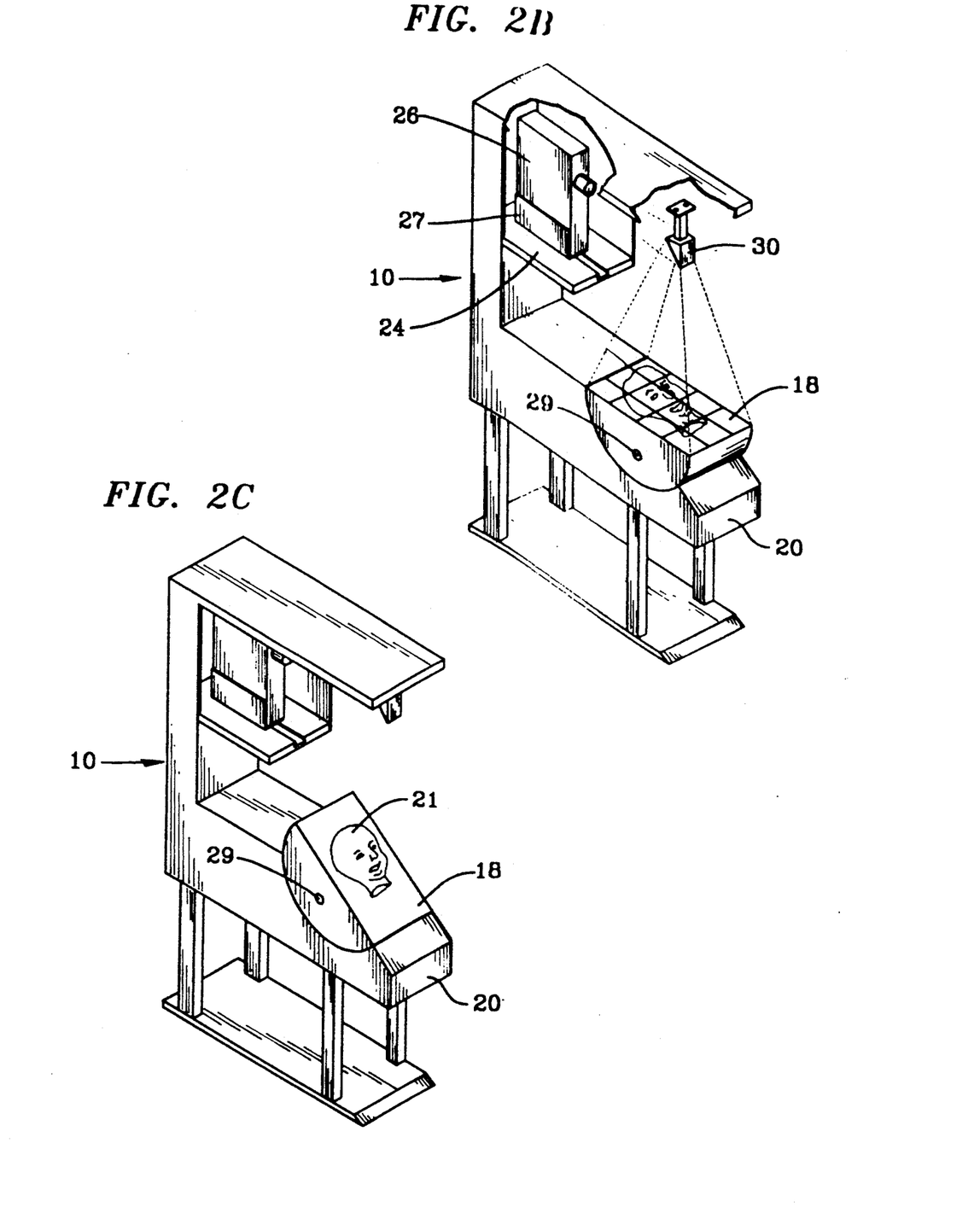
FIG. 2B is a partial cross-sectional perspective view of the projection assisted sculpting stand of FIG. 2.
FIG. 2C is a perspective view of the projection assisted sculpting stand of FIG. 2 illustrating a rotated sculpture surface.

Now referring to FIGS. 2B and 2C, my sculpture stand 10 is further illustrated showing shelf 24 supporting video projector 26 and having a means 27 for slidable movement of projector 26 toward and away from mirror 30, thereby allowing a reflection onto sculpture surface 18 of an image of variable size. FIG. 2C illustrates sculpture surface 18 rotated toward the operator for enhanced viewing and easier access to the clay 21 during the sculpting step.

Figure 3A:
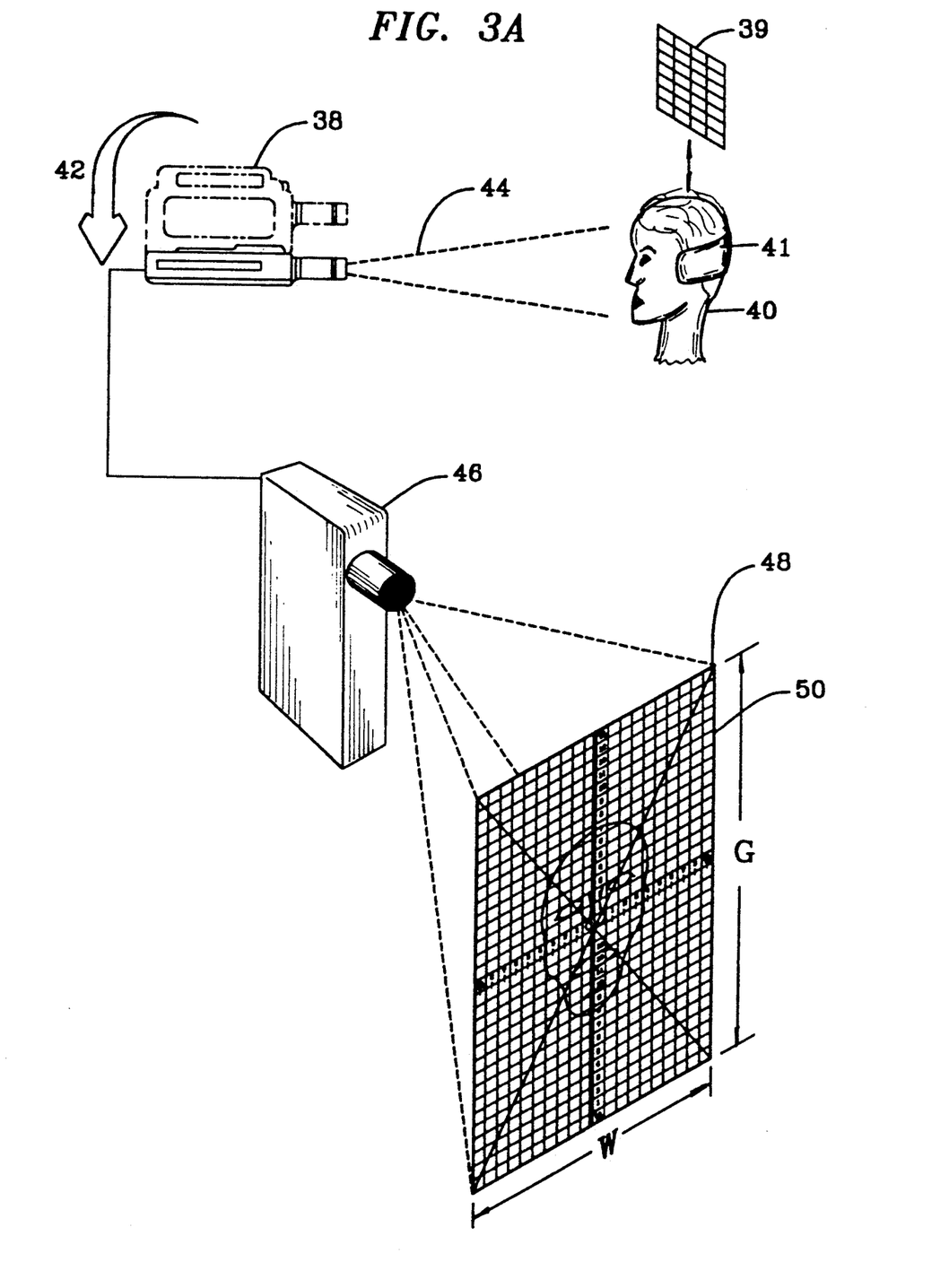
FIG. 3A is a pictorial view illustrating a real time video recording and projection onto a verification grid carved out during the creation of the rear projection headscreen used with the video mannequin of the instant invention.

FIG. 3A is a schematic representation of the video recording apparatus used in recording of images for use in creating the mannequin head 6 by use of the sculpting stand apparatus 10. Camera 38 is shown recording an image of an actor or model 40. In reproducing the head portion of the model along with recording the model's verbal presentation, it is beneficial to fit the entire face on the screen in a vertical format thereby maximizing the use of each pixel and hence optimizing the image quality. Thus, by inverting the camera 38 ninety degrees as shown by arrow 42 in FIG. 3B, the resolution of the facial features is enhanced. A pixel range of 320×450 pixels may be used for adequate picture resolution during imaging. The optical angle 44 illustrates the rotational aspects of the image which can be simultaneously projected by projector 46 to a secondary surface such as verification grid 48 containing cross hatching 50. Grid 48, whether it be a high resolution monitor, or a screen if visible to the actor 40, allows the actor to monitor her or himself for proper positioning, or, more preferably, the model's head is kept stationary during the recording step and camera 38 is used for recording only.

Figure 3B:
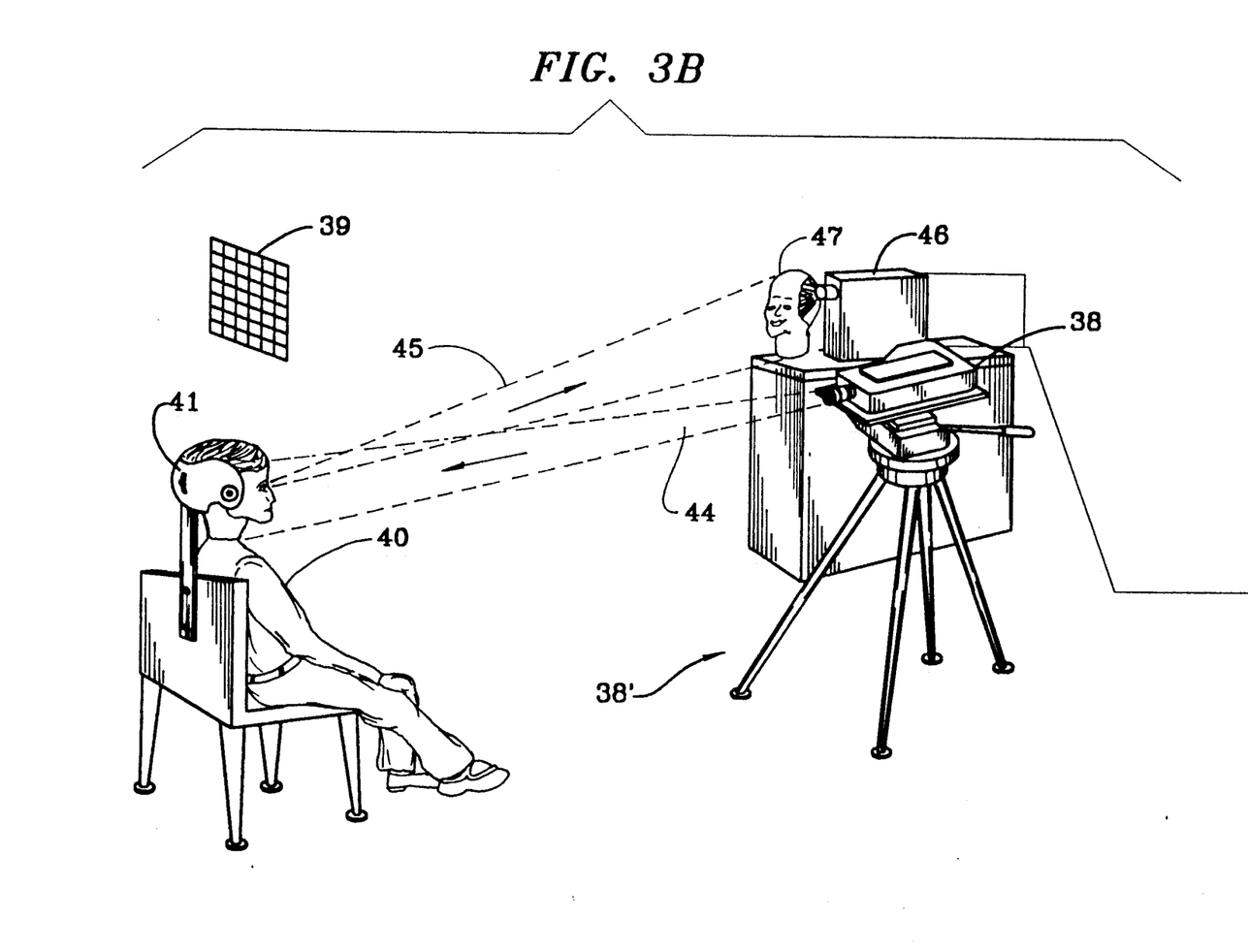
FIG. 3B further illustrates the apparatus used to create the rear projection headscreen of the instant invention.

FIG. 3B is a pictorial representation of a typical audio-visual message recording apparatus wherein, unlike FIG. 3A, the projection is into a headscreen 47 wherein camera 38 is shown recording an image of an actor 40 whose head is secured by a head brace 41. The image being recorded may be simultaneously projected by projector 46 onto headscreen 47 or onto a verification grid such as 48 in FIG. 3A, visible to model 40, allowing the model to monitor himself in real time to ensure proper positioning or verify that facial features are kept within the boundaries of a previously finished headscreen 47.

Also shown in FIGS. 3A and 3B is a master grid 39 which is connected to head brace 41 prior to the actor 40 being positioned there. Camera 38 is then positioned to record master grid 39 and to project the image of said grid 39, preferably in real time, onto verification grid 48 using projector 46. In this way, camera 38 and its stand 38' are locked or otherwise fixed in position relative to brace 41 so that during recordation of the audio visual message proper registry will be present between the face of actor 40 and the to-be-created headscreen 96.

Figure 4:
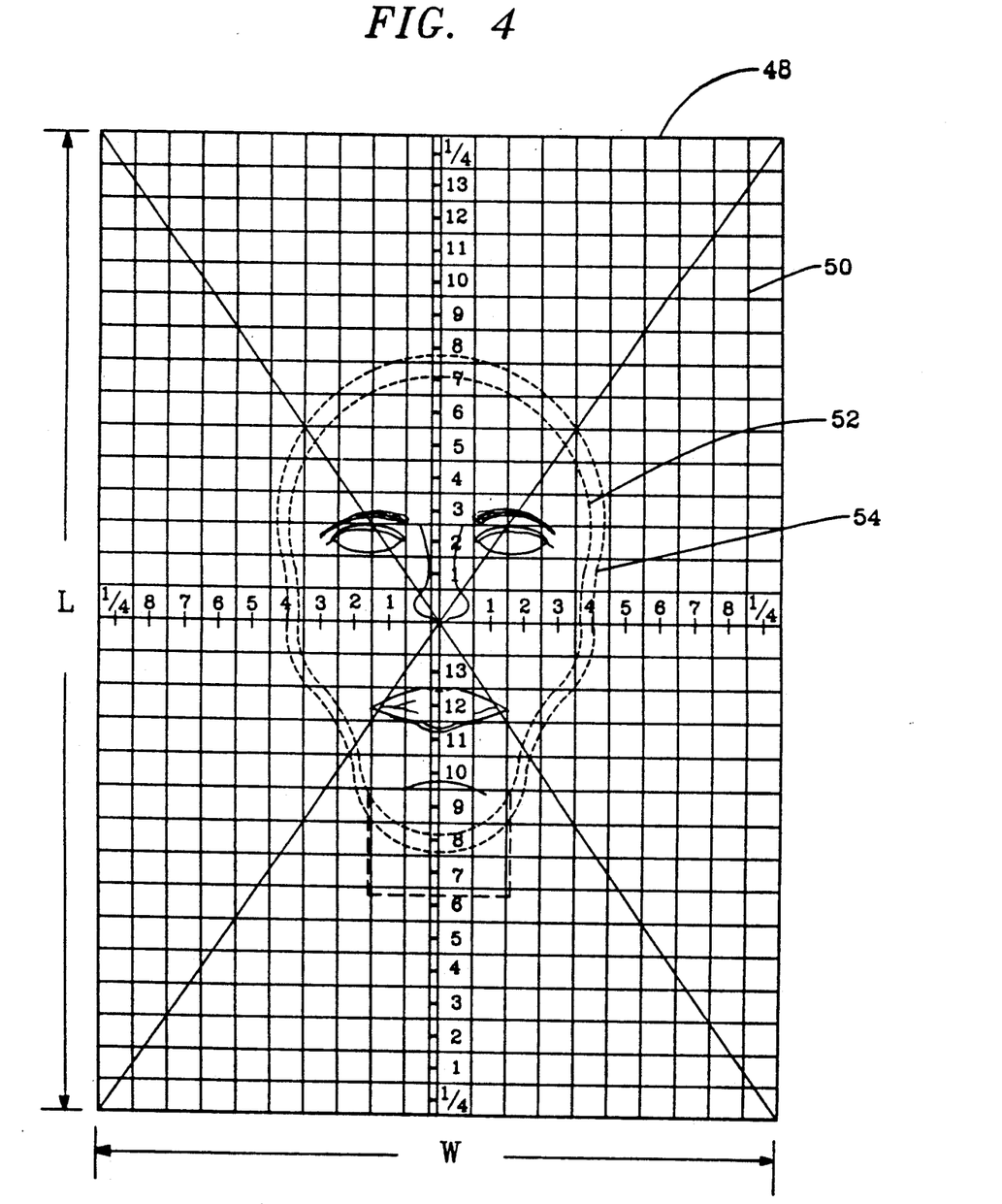
FIG. 4 is a front view of the recorded image projected on a cross hatched verification grid.

FIG. 4 illustrates a verification grid 48 having cross hatching 50 as used in FIG. 3A to allow for accurate alignment of the actor's head prior to recording of the audio-visual message. The preferred alignment grid has a height G of at least 15 inches and a width W of at least 12 inches. By use of grid 48 as projected upon the sculpting stand the actor's image 52 can be increased or decreased in size by a proportionate amount shown by the area between shapes 52 and 54 as the sculpture rises up from surface 18, and thus ensuring the accuracy of the sculpted facial replica. For example, for accurate positioning of a projected face image onto the sculpting surface, it is necessary to first center the face image onto the grid. By placement of the nostrils of the projected image onto the points 53 and 55 located near the middle of the grid and increasing the size of the projected face image as necessary to compensate for the decrease in image size as the sculpture is made larger in the direction of the lens. Preferably, very little enlargement, or none at all, is necessary. This allows for a proportionate decrease in image size as the face sculpture rises up from the surface 18 during the sculpting step.

Figure 5:
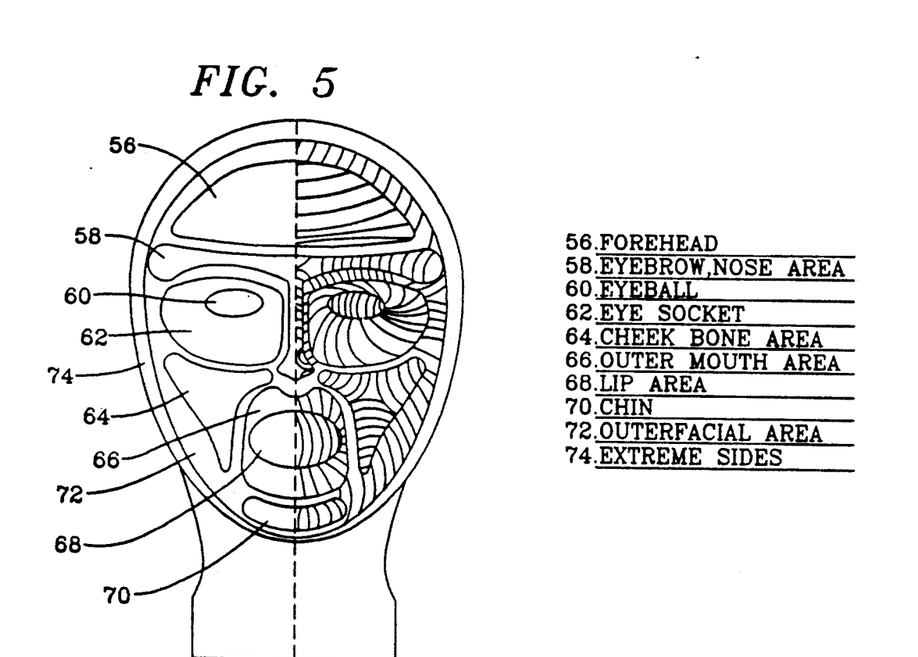
FIGS. 5 and 6 are front views of the actor's facial contours and features, respectively.

FIG. 5 demonstrates the critical aspects of the model's face to be incorporated into the facial replica, namely the forehead 56, the eyebrow and nose area 58, the eye 60, the eye socket 62, the cheekbone 64, the outer mouth area 66, the lip area 68, the chin 70, the outer facial area 72, and the extreme sides 74. These contours are typical of the human face and can be molded as shown out of clay or a similar moldable material and by use of still photographs, freeze framing and/or measuring devices, the features are measured and the clay molded to the appropriate configuration. The still frames should preferably include: one straight on, one ¾ profile to each side, and one profile to each side. Facial measurements can be added to or subtracted from the model to further add realism while confirming the desired end result by continued projection of the recorded image upon the mold.

Figure 6:
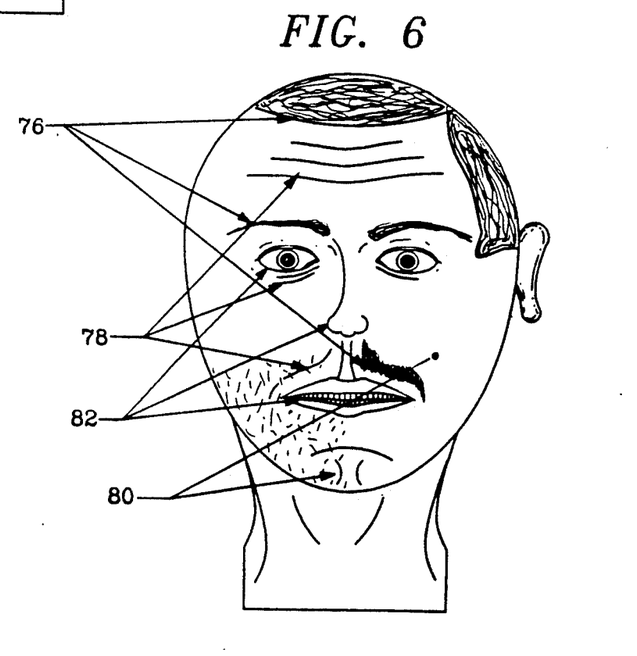

Now referring to FIG. 6, exterior and unusual features of the actor show up better when projected rather than included as a sculpted detail of the headscreen. Such features include but are not limited to, facial hair 76, facial lines or folds 78, cleft chin 80, and other fine details 82. The following are basic modifications for enhancing the sculpture for use as a headscreen without sacrificing actor likeness:

a) No feature surface should be angled greater than 85 degrees;
b) Any facial feature and face mold symmetry in general must have matching angles on both sides or halves, with the exception of the top of the head and the bottom of the chin or jaw;
c) The projected image should carry approximately 50% of the total detail of the displayed video mannequin and the headscreen contouring should carry the remaining 50% of the total effect;
d) The molded chin or jaw should have approximately a 75 to 90 degree downward slope to help reduce the visual effect of the projected jaw moving up and down while the screen remains stationary;
e) Any surface dents or unevenness on the face mold should be smoothed out;
f) No facial feature can be overly defined or pointed such as the end of the nose, which should be fully rounded and muted if possible to assist the rear-screen dispersion of light onto the screen surface.

The projection of images onto the clay being molded allows the operator to modify the basic mold to accommodate the placement and alignment of various facial features and allows for the adjusting of the mold for lighting or other particulars arising out of the image recording process, molding and so forth. This is of particular importance when cloning an unavailable person while using an actor's voice and face for the projection means. The projection allows the mold to be modified in direct relation to the resulting headscreen before production of said headscreen.

Once the head likeness has been sculpted out of clay, the sculpture is used to make a negative plaster cast for creating a positive epoxy resin cast for use in conventional vacuum molding to form a clear plastic, preferably UVEX or the like, headscreen 84. The headscreen 84, made from 1/32" to ¼", preferably 1/16", clear UVEX material allows for a soft, non-brittle headscreen whose inner surface 85 may be treated for use as a projection screen by sand-blasting with a fine silica sand or other texturing methods, to provide a light diffusive texture having a pore size of, preferably, 3 to 8 microns. Because UVEX is a soft material and the inner screen surface 85 is deeply and evenly textured, the sand particle impact depth and density ar deep and overlapping. It should be noted that use of smaller pore sizes is best suited for headscreens wherein a reduction of headscreen brightness is sought such as in a miniaturized headscreen. Use of oversize headscreens required the use of larger pore sizes to prevent minimal loss of brightness. It should be also be noted that UVE is the preferred plastic as other plastics react differently to the sand treatment yielding unacceptable degrees of texturing. Deeper and greater the density of impacts increases the material's ability to refract light, thereby enhancing the visual effect of the rear-screen treatment. In addition, the UVEX is tinted with, or comprised of, a dye having black, brown and a green component for color correction of the screen, which, as has been discovered through experimentation, renders the image displayed rather realistic. The dye composition may be, in the preferred embodiment, 60% black dye, 30% brown dye and 10% green dye. The outer surface of the head and screen are painted or otherwise treated by application of translucent film such as paint to act as a means for light blocking wherein the combination thereof assimilates that of a human skin surface reflecting light as opposed to exclusively illuminating light and color. By applying opaque skin colored paint onto any screen surfaces which are nearly parallel to the projector lens, light transmission from the projected image is blocked in such a manner that the headscreen gives the appearance of reflecting/refracting the projected image as opposed to appearing as simply an "illuminated" headscreen. In addition, applying a light opaque skin colored paint over the whole screen surface provides a means for defusing any external or ambient light reflecting off of the screen surface from the front. This tactic allows the headscreen to be viewed even in indirect sunlight.

Sandblasting is preferred over coating to avoid washout typical in headscreens using only a coating to enhance translucency. The completed headscreen is then incorporated with the LCD video projection thereby producing a clone replica of the person depicted.

Due to the superior quality of the UVEX material, the video headscreens have a greater ability to refract or hold more light in the rear-screened surface. Thus, the UVEX video headscreen can handle a greater amount of ambient light, before image washout occurs. Additionally, the colors are richer and more vibrant, the face image when viewed from the extreme sides has less wash out than conventional coating, and the headscreen is more capable of withstanding cracks and general damage due to impact with foreign objects.

Figure 7:
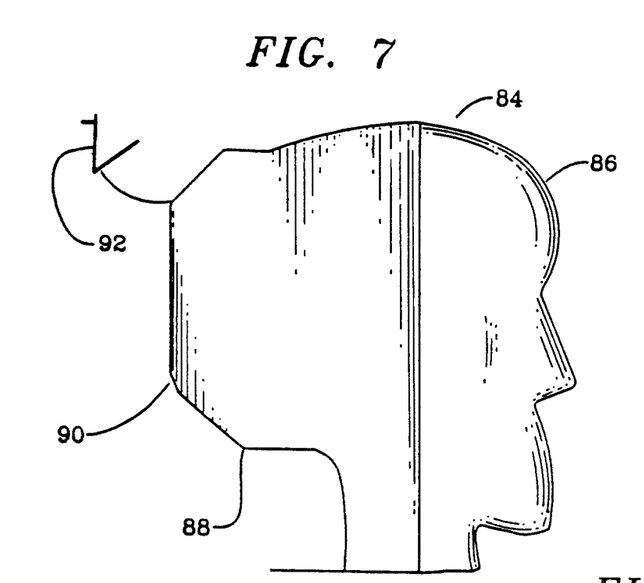
FIG. 7 is a side view of the headscreen.
Figure 8:
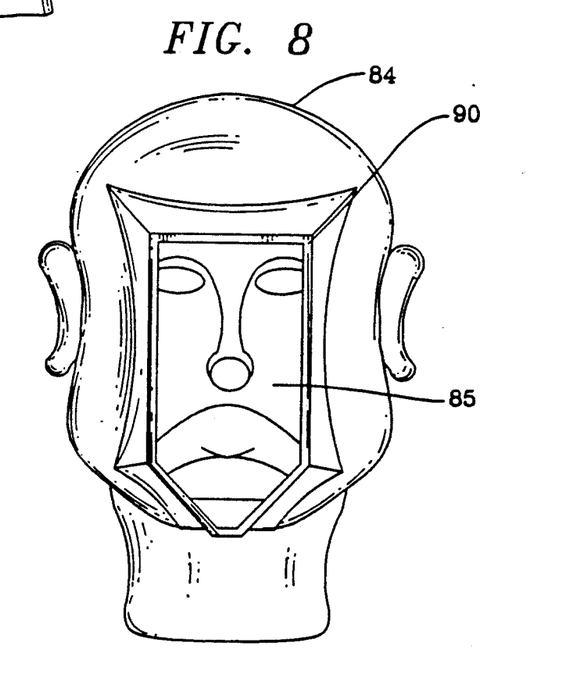
FIG. 8 is a rear view of the headscreen.

FIGS. 7 and 8 illustrate a side view of a manufactured mannequin head 84 having a headscreen portion 86 and a rear portion 88. Said rear portion 88 defines an opening 90 by which a bracket 92 is used to secure the headscreen 84 to projector support 1 for alignment of the projector lens 90 with headscreen 86 and thus, projection on the inner surface of the face portion 86.

Figure 9:
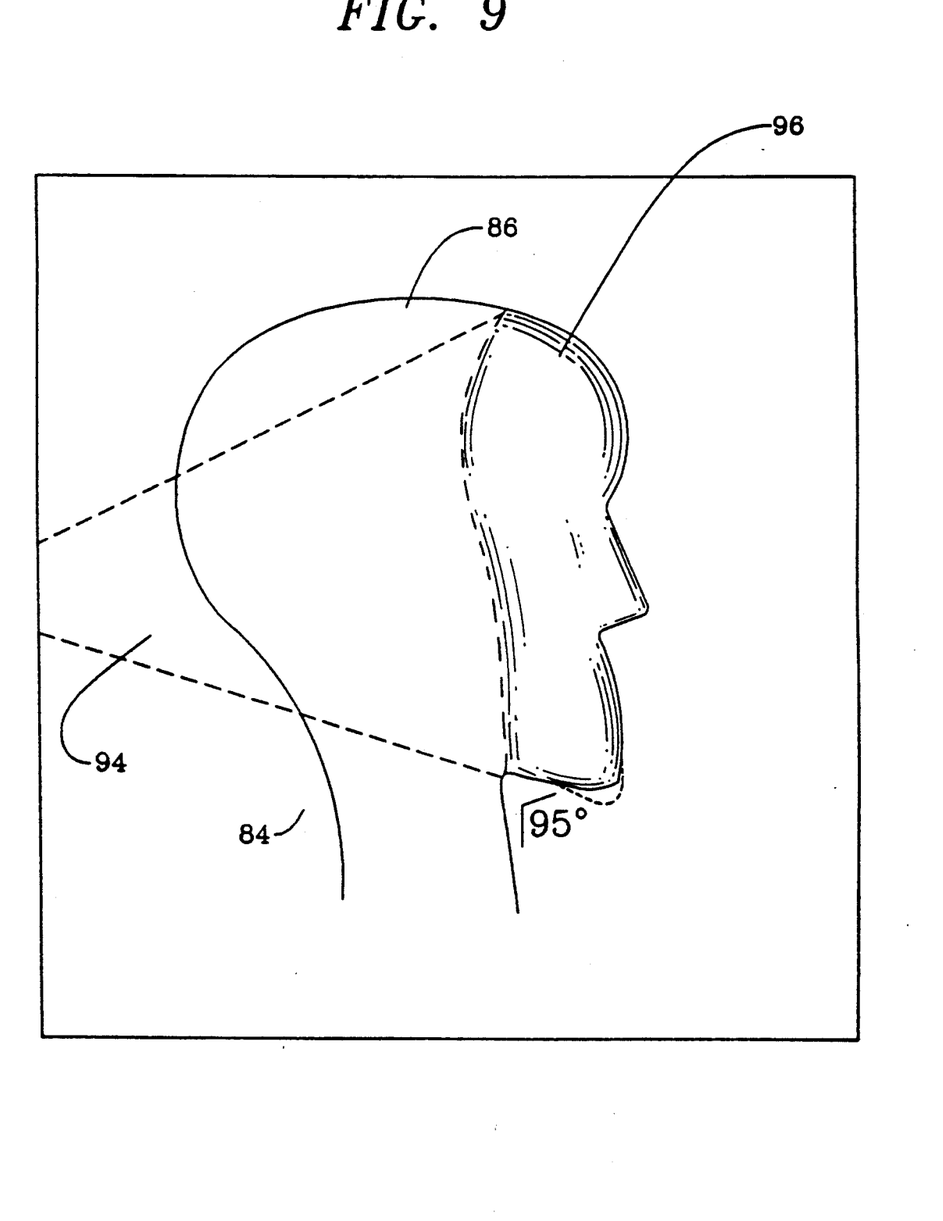
FIG. 9 is a side view of the mannequin head and headscreen.

FIG. 9 shows a cutaway side view of the headscreen 84 together with a depicted image projection 94. Generally, the entire headscreen area 86 is illuminated by the projector 90. The projector illuminates from the top of the forehead to the bottom of the neck, thus providing illumination for the entire frontal portion of the head 84.

Figure 10:
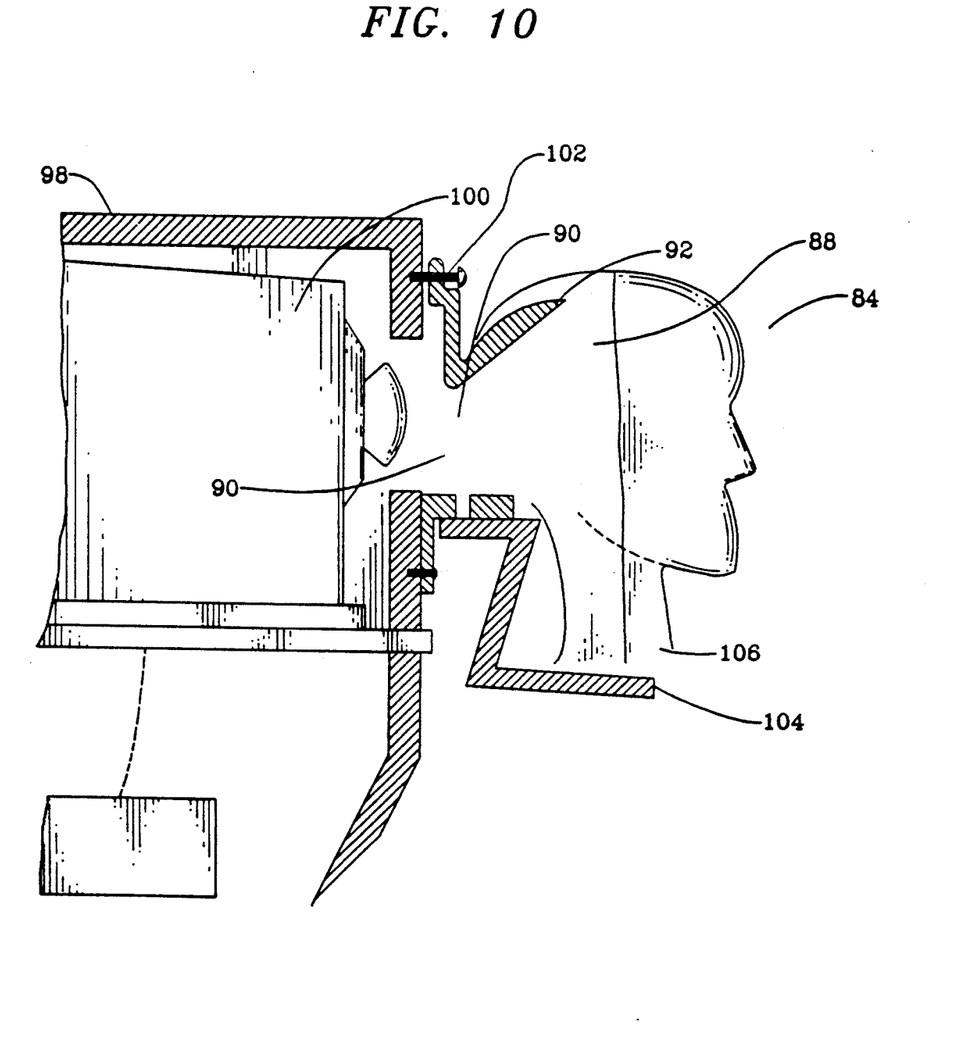
FIG. 10 is a partial cross-sectional side elevational view of a projector housing and the head and neck portion of the mannequin.

FIG. 10 is a side view of the top portion of the video mannequin as mounted on a projector stand 1. Means for attaching the headscreen 84 to projector housing 98 of stand 1 are shown, along with the position of the projector 100 relative to the aperture 90 of the rear head portion 88. Bracket 92 is shown connecting the inside of the top of the head 84 to the stand 1. Bracket 104 attaches the stand to the neck portion 106 of the mannequin torso 9 to provide additional support. Thus, the head portion is stabilized and secured to the video mannequin support 1 through two attachment means.

It is to be understood that while I have illustrated and described certain examples of practicing my method for producing video mannequins, it is not to be limited to the specific examples or components utilized in accomplishing the method herein described and shown. It will be apparent to those skilled in the art that various changes may be made without departing from the scope of the invention and the invention is not to be considered limited to what is shown in the drawings and described in the specification.

What I claim is:

1. A process for creating a contoured dimensional sculpture of an actor's head by image projection, comprising the steps of:
   (a) positioning a recording camera in relation to said actor's head, said actor's head being spatially positioned in a head brace;
   (b) using said recording camera and a projector to project an image of said actor's head onto a verification grid and fixedly aligning said camera with respect to said brace;
   (c) positioning said actor's face with respect to said brace such that said actor's face is aligned with respect to said verification grid to obtain the proper alignment of said actor's face with respect to said recording camera;
   (d) recording an audio-video message from said actor;
   (e) projecting said image of said actor onto said verification grid to obtain an outer contour of said actor's head;
   (f) molding clay into a three dimensional sculpture of said actor's head in accordance with said outer contour, measurements of facial and head features, and visual projection of said actor's face onto said clay from said recorded audio-video message;
   (g) forming a cast of said three dimensional sculpture and molding a hollow shell therefrom which conforms to the dimensional contour of said cast.

2. The process recited in claim 1, further comprising the step of tinting said headscreen concave inner surface of said molded shell.

3. The process recited in claim 1, further comprising the step of applying translucent film of varied densities to at least part of the convex outer surface of said headscreen.

4. The process recited in claim 1, further comprising the step of adding ears to said headscreen.

5. The process recited in claim 1, further comprising the step of adding material which replicates facial hair to said convex outer surface of said headscreen so as to resemble appropriate human features.

6. The process recited in claim 1 wherein said molded shell is fabricated from a transparent sheet of UVEX plastic.

7. The process recited in claim 1, wherein said headscreen concave inner surface is textured by sandblasting.

8. The process recited in claim 2, wherein said tinting is accomplished by a combination dye of black, brown and green.

9. The process recited in claim 8, wherein said dye composition is 60% black, 30% brown and 10% green.

10. The process recited in claim 8, wherein said colored dye is impregnated within said molded shell.

11. The process recited in claim 8, wherein said colored dye is applied to said headscreen inner surface after sandblasting.

12. The process recited in claim 1, wherein the outer surface of said headscreen is colored by airbrushing opaque paint thereon.

13. The process recited in claim 12, wherein said opaque paint replicates the color of human skin when said visual image is projected thereon.

14. The process recited in claim 1, wherein step (b) further comprises rotating said camera 90 degrees for recording an image in a vertical format.

15. The process recited in claim 1, wherein step (g) further comprises the use of a projection assisted sculpture stand having a means for indirectly projecting said image onto said clay mold.

* * * * *